(12) United States Patent
Ji et al.

(10) Patent No.: US 12,430,798 B2
(45) Date of Patent: Sep. 30, 2025

(54) REINFORCEMENT LEARNING-BASED LABEL-FREE SIX-DIMENSIONAL OBJECT POSE PREDICTION METHOD AND APPARATUS

(71) Applicant: TSINGHUA UNIVERSITY, Beijing (CN)

(72) Inventors: Xiangyang Ji, Beijing (CN); Jianzhun Shao, Beijing (CN)

(73) Assignee: TSINGHUA UNIVERSITY, Beijing (CN)

(*) Notice: Subject to any disclaimer, the term of this patent is extended or adjusted under 35 U.S.C. 154(b) by 650 days.

(21) Appl. No.: 17/881,615

(22) Filed: Aug. 5, 2022

(65) Prior Publication Data

US 2023/0005181 A1   Jan. 5, 2023

Related U.S. Application Data

(63) Continuation of application No. PCT/CN2020/091342, filed on May 20, 2020.

(30) Foreign Application Priority Data

Mar. 18, 2020   (CN) .......................... 202010191659.5

(51) Int. Cl.
   *G06T 7/73*   (2017.01)
   *G06T 17/00*   (2006.01)

(52) U.S. Cl.
   CPC ............... *G06T 7/74* (2017.01); *G06T 17/00* (2013.01); *G06T 2200/08* (2013.01); *G06T 2207/20081* (2013.01)

(58) Field of Classification Search
   CPC ....... G06T 7/74; G06T 17/00; G06T 2200/08; G06T 2207/20081; G06T 2207/20084;
   (Continued)

(56) References Cited

U.S. PATENT DOCUMENTS

2018/0165602 A1   6/2018   Van Seijen et al.
2018/0165603 A1   6/2018   Van Seijen et al.
(Continued)

FOREIGN PATENT DOCUMENTS

CN   109164821 A   1/2019
CN   109190537 A   1/2019
(Continued)

OTHER PUBLICATIONS

English machine translation of CN 109190537. (Year: 2019).*
(Continued)

*Primary Examiner* — Phuoc Tran (57) ABSTRACT

Provided are a reinforcement learning-based label-free six-dimensional object pose prediction method and apparatus. The method includes: obtaining a target image to be predicted, the target image being a two-dimensional image including a target object; performing pose prediction based on the target image by using a pre-trained pose prediction model to obtain a prediction result, the pose prediction model being obtained by performing reinforcement learning based on a sample image; and determining a three-dimensional position and a three-dimensional direction of the target object based on the prediction result. The pose prediction model is trained by introducing reinforcement learning, the pose prediction is performed based on the target image by using the pre-trained pose prediction model, and thus the problem of six-dimensional object pose estimation based on two-dimensional images can be solved in the absence of real pose annotation, which ensures the prediction effect of label-free six-dimensional object pose prediction.

10 Claims, 5 Drawing Sheets

(58) Field of Classification Search
CPC . G06T 7/70; G06T 7/73; G06N 3/006; G06N 3/092; G06N 7/01; G06N 3/08; G06N 3/045; Y02T 10/40
See application file for complete search history.

(56) References Cited

U.S. PATENT DOCUMENTS

| | | | |
|---|---|---|---|
| 2019/0122380 A1 | 4/2019 | Cao et al. | |
| 2020/0304707 A1* | 9/2020 | Williams | G06N 20/00 |
| 2021/0004984 A1* | 1/2021 | Ji | G06T 7/11 |
| 2022/0024037 A1* | 1/2022 | Lee | B25J 13/08 |

FOREIGN PATENT DOCUMENTS

| | | |
|---|---|---|
| CN | 109215080 A | 1/2019 |
| CN | 109521774 A | 3/2019 |
| CN | 109858430 A | 6/2019 |
| CN | 110263979 A | 9/2019 |

OTHER PUBLICATIONS

Do et al. "Deep-6DPose: Recovering 6D Object Pose from a Single RGB Image," Feb. 28, 2018. (Year: 2018).*
Zeng et al. "Multi-view Self-supervised Deep Learning for 6D Pose Estimation in the Amazon Picking Challenge," May 7, 2017. (Year: 2017).*
International Search Report dated Dec. 21, 2020 in International Application No. PCT/CN2020/091342. English translation attached.
First Office Action from corresponding Chinese Application No. 202010191659.5, dated Apr. 5, 2023 . English translation attached.

* cited by examiner

REINFORCEMENT LEARNING-BASED LABEL-FREE SIX-DIMENSIONAL OBJECT POSE PREDICTION METHOD AND APPARATUS

CROSS-REFERENCE TO RELATED APPLICATIONS

This application is a continuation of International Application No. PCT/CN2020/091342, filed on May 20, 2020, which claims priority to Chinese Patent Application No. 202010191659.5, filed on Mar. 18, 2020, the entire disclosures of which are incorporated herein by their reference.

FIELD

The present disclosure relates to the technical field of artificial intelligence, and more particularly, to a reinforcement learning-based label-free six-dimensional object pose prediction method and apparatus.

BACKGROUND

A six-dimensional object pose prediction method includes a method for locating a three-dimensional position and a three-dimensional direction of a target object from a two-dimensional image.

In the related art, the six-dimensional object pose prediction method may include the following steps: obtaining, by a computer device, a two-dimensional image to be detected, comparing a render subject and an observed subject of the target object in a two-dimensional space, and predicting a six-dimensional pose difference between a current estimated value and a real value to estimate the six-dimensional object pose.

Real pose annotation is involved in the above method and real pose label annotation is crucial to the current method to achieve pose optimization performance. However, the obtaining process of real six-dimensional object pose-annotated two-dimensional images is quite complicated, which greatly limits the implementation of the above method. A suitable and accurate six-dimensional object pose prediction method has not yet been provided.

SUMMARY

In view of this, the present disclosure proposes a reinforcement learning-based label-free six-dimensional object pose prediction method and apparatus. The following technical solutions are provided.

According to an aspect of the present disclosure, a reinforcement learning-based label-free six-dimensional object pose prediction method is provided. The method is applied in a computer device and includes: obtaining a target image to be predicted, wherein the target image is a two-dimensional image including a target object; performing pose prediction based on the target image by using a pose prediction model that has been pre-trained to obtain a prediction result, wherein the pose prediction model is a model obtained by performing reinforcement learning based on a sample image; and determining a three-dimensional position and a three-dimensional direction of the target object based on the prediction result.

In a possible implementation manner, the method further includes, prior to said performing the pose prediction based on the target image by using the pose prediction model that has been pre-trained to obtain the prediction result: performing reinforcement learning training by using the sample image to obtain the pose prediction model, wherein the pose prediction model is a model based on a Markov Decision Process.

In another possible implementation manner, the pose prediction model includes a basic network and a policy network, and said performing the reinforcement learning training by using the sample image to obtain the pose prediction model includes: extracting state information of the target object from the sample image through the basic network, wherein the state information includes an observed image, a real mask image frame corresponding to the observed image, a rendered image, and a render mask corresponding to the rendered image; inputting the state information into the policy network to output action information, wherein the action information is used to indicate a rotational distribution feature and a translational distribution feature of the target object; re-rendering the observed image based on the action information; calculating, after the re-rendering, a reward value based on a difference between a current render mask and the real mask image frame in a two-dimensional space; and updating the policy network based on at least one sample data set, wherein the at least one sample data set includes the state information and the action information of the target object, and a corresponding reward value.

In another possible implementation manner, the reward value includes a differential reward value, a goal achievement reward value and a concentration reward value; and the differential reward value is used to indicate a matching degree between a current rendered image and the observed image, the concentration reward value is used to indicate a matching degree in geometric position between the current rendered image and the observed image, and the goal achievement reward value is used to indicate whether to stop updating the policy network.

In another possible implementation manner, said updating the policy network based on at least one sample data set includes: updating the policy network based on the at least one sample data set through a Proximal Policy Optimization (PPO) algorithm; and updating a value function of the policy network based on cached data in a priority queue that is set, wherein the cached data is the at least one sample data set that is stored in a buffer and has been used.

According to another aspect of the present disclosure, there is provided a label-free six-dimensional object pose prediction apparatus. The apparatus is applied in a computer device and includes: an obtaining module configured to obtain a target image to be predicted, wherein the target image is a two-dimensional image including a target object; a predicting module configured to perform pose prediction based on the target image by using a pose prediction model that has been pre-trained to obtain a prediction result, wherein the pose prediction model is a model obtained by performing reinforcement learning based on a sample image; and a determining module configured to determine a three-dimensional position and a three-dimensional direction of the target object based on the prediction result.

In a possible implementation manner, the apparatus further includes: a training module configured to perform reinforcement learning training by using the sample image to obtain the pose prediction model, the pose prediction model being a model based on a Markov Decision Process.

In another possible implementation manner, the pose prediction model includes a basic network and a policy network, and the training module is further configured to: extract state information of the target object from the sample image through the basic network, the state information including an observed image, a real mask image frame corresponding to the observed image, a rendered image, and a render mask corresponding to the rendered image; input the state information into the policy network to output action information, wherein the action information is used to indicate a rotational distribution feature and a translational distribution feature of the target object; re-render the observed image based on the action information; calculate, after the re-rendering, a reward value based on a difference between a current render mask and the real mask image frame in a two-dimensional space; and update the policy network based on at least one sample data set, where the at least one sample data set includes the state information and the action information of the target object, and a corresponding reward value.

In another possible implementation manner, the reward value includes a differential reward value, a goal achievement reward value and a concentration reward value; and the differential reward value is used to indicate a matching degree between a current rendered image and the observed image, the concentration reward value is used to indicate a matching degree in geometric position between the current rendered image and the observed image, and the goal achievement reward value is used to indicate whether to stop said updating the policy network.

In another possible implementation manner, the training module is further configured to: update the policy network based on the at least one sample data set through a PPO algorithm; and update a value function of the policy network based on cached data in a priority queue that is set, the cached data being the at least one sample data set that is stored in a buffer and has been used.

According to another aspect of the present disclosure, provided is a computer device including: a processor; and a memory having instructions stored thereon, the instructions are executable by the processor, and the processor is configured to: obtain a target image to be predicted, wherein the target image is a two-dimensional image including a target object; perform pose prediction based on the target image by using a pose prediction model that has been pre-trained to obtain a prediction result, wherein the pose prediction model is a model obtained by performing reinforcement learning based on a sample image; and determine a three-dimensional position and a three-dimensional direction of the target object based on the prediction result.

According to another aspect of the present disclosure, provided is a non-volatile computer-readable storage medium having computer program instructions stored thereon, and the computer program instructions, when executed by a processor, implement the above method.

The embodiments of the present disclosure provide a reinforcement learning-based label-free six-dimensional object pose prediction method, including: obtaining a target image to be predicted by a computer device, the target image being a two-dimensional image including a target object; performing pose prediction based on the target image by using a pose prediction model that has been pre-trained to obtain a prediction result, the pose prediction model being a model obtained by performing reinforcement learning based on a sample image; and determining a three-dimensional position and a three-dimensional direction of the target object based on the prediction result. That is, the pose prediction model is trained by introducing reinforcement learning, and the problem of six-dimensional object pose estimation based on a two-dimensional image can be solved in the absence of real pose annotation, which ensures the prediction effect of label-free six-dimensional object pose prediction.

BRIEF DESCRIPTION OF DRAWINGS

The accompanying drawings, which are incorporated in and constitute a part of the disclosure, illustrate exemplary embodiments, features, and aspects of the present disclosure, and serve to explain the principles of the present disclosure, together with the description.

DESCRIPTION OF EMBODIMENTS

Various exemplary embodiments, features and aspects of the present disclosure will be described in detail below with reference to the accompanying drawings. The same reference signs indicate the same or similar elements. While various aspects of the embodiments are shown in the drawings, the drawings are not necessarily drawn to scale unless otherwise indicated.

The special term "exemplary" used herein means "serving as an example, embodiment, or illustration." Any "exemplary" embodiment described herein is not necessarily to be construed as being preferred or advantageous over other embodiments.

In addition, in order to better illustrate the present disclosure, numerous specific details are given in the following detailed implementation. It will be understood by those skilled in the art that the present disclosure may be practiced without certain specific details. In some instances, methods, means, components and circuits well known to those skilled in the art have not been described in detail so as not to obscure the subject matter of the present disclosure.

Figure 1:
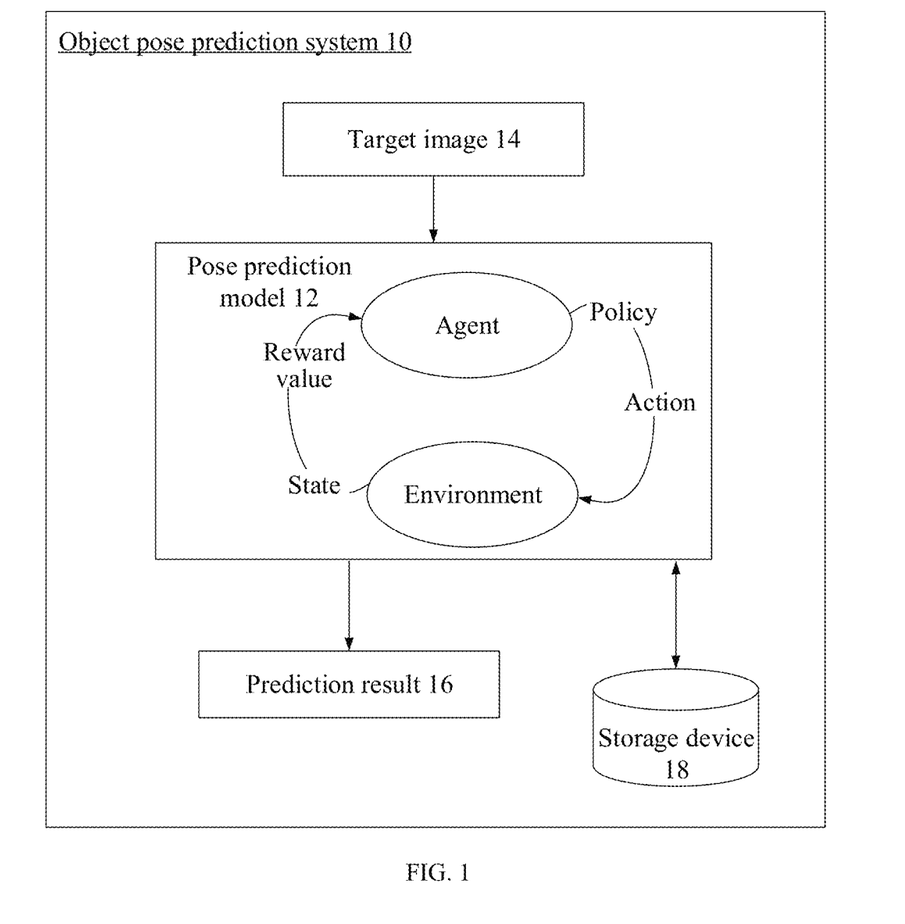
FIG. 1 shows a schematic diagram of an object pose prediction system according to an exemplary embodiment of the present disclosure.

Please refer to FIG. 1, which shows a schematic diagram of an object pose prediction system according to an exemplary embodiment of the present disclosure.

The object pose prediction system 10 is applied in a computer device, and the computer device may be a terminal or a server.

The object pose prediction system 10 is configured to realize a label-free six-dimensional object pose prediction for a two-dimensional image to be predicted. The object pose prediction system 10 includes a pose prediction model 12.

The object pose prediction system 10 is configured to obtain a two-dimensional image, that is, a target image 14 including a target object, and perform pose prediction based on the target image 14 by using a pose prediction model that has been pre-trained to obtain a prediction result 16, to determine a three-dimensional position and a three-dimensional direction of the target object.

The pose prediction model 12 is a model obtained by training using reinforcement learning, so as to implement a label-free six-dimensional object pose optimization solution.

The pose prediction model 12 includes elements such as tools, environments, policies, actions, states, and reward values. For relevant details, reference may be made to the descriptions in the following embodiments, which will be introduced later.

Optionally, the pose prediction model 12 adopts a Markov Decision Process (MDP) model architecture.

Optionally, the object pose prediction system 10 further includes: a storage device 18. The storage device 18 is a device having a data storage function. The storage device 18 is configured to store data used in the label-free six-dimensional object pose prediction process. For example, the data include state information corresponding to the target image to be predicted, relevant parameters of the pose prediction model 12, etc., which is not limited in the embodiments of the present disclosure.

Hereinafter, the reinforcement learning-based label-free six-dimensional object pose prediction method according to the embodiment of the present disclosure will be introduced by using an illustrative embodiment.

Figure 2:
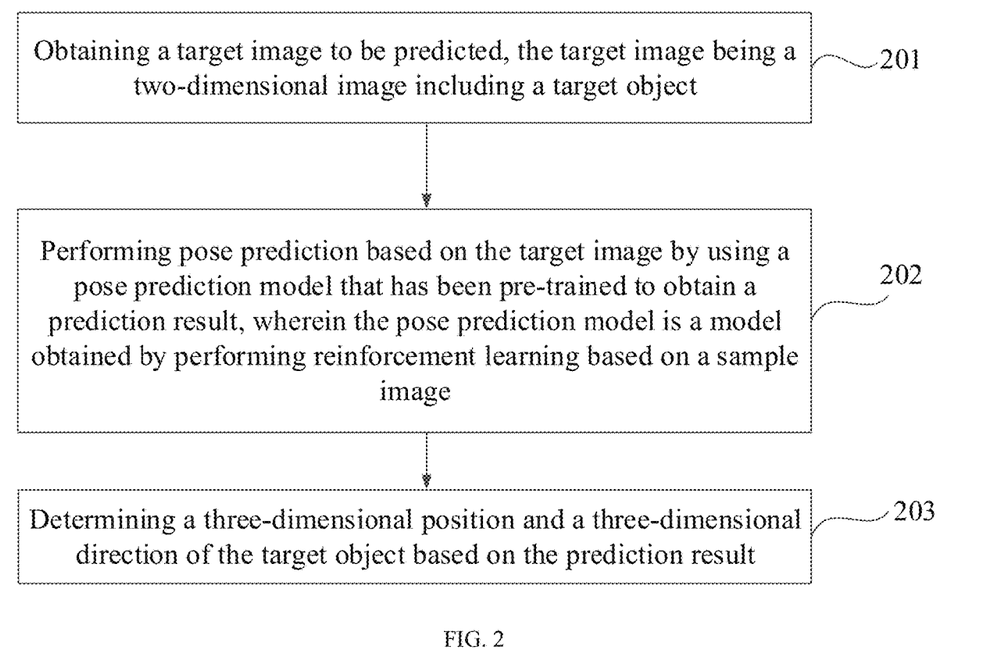
FIG. 2 shows a flowchart of a reinforcement learning-based label-free six-dimensional object pose prediction method according to an exemplary embodiment of the present disclosure.

Please refer to FIG. 2, which shows a flowchart of a reinforcement learning-based label-free six-dimensional object pose prediction method according to an exemplary embodiment of the present disclosure. The method can be applied in a computer device, and the method includes but is not limited to the following steps.

In Step 201, a target image to be predicted is obtained, the target image being a two-dimensional image including a target object.

The two-dimensional image to be predicted by the computer device and including a target object is a target image, and the target object is a subject to be subjected to pose prediction, for example, the target object is an object or a person.

Optionally, the computer device obtains a candidate two-dimensional image, extracts a target region from the candidate two-dimensional image, the target region being a region where the target object is located in the candidate two-dimensional image, and determines the target region as the target image to be predicted.

In Step 202, pose prediction is performed based on the target image by using a pose prediction model that has been pre-trained to obtain a prediction result, the pose prediction model being a model obtained by performing reinforcement learning based on a sample image.

The computer device performs pose prediction based on the target image by using the pose prediction model that has been pre-trained to obtain the prediction result.

The computer device obtains the pre-trained pose prediction model, and inputs the target image into the pose prediction model to output the prediction result.

The pose prediction model is a model obtained by performing reinforcement learning based on the sample image.

The pose prediction model is a model configured to indicate two-dimensional image annotations as weak supervision information and perform six-dimensional object pose prediction based on a reward sequence decision.

The pose prediction model is a model obtained by training an original parameter model with the sample image. The sample image is an image including the target object.

The pose prediction model is a reinforcement learning model with the ability of predicting the six-dimensional object pose of the target object in the target image.

The pose prediction model is configured to extract the prediction result of the target object in the target image.

Optionally, the pose prediction model is configured to represent a correlation between the target object in the target image and the prediction result.

Optionally, the pose prediction model is configured to represent a correlation between the target object in the target image and the prediction result in a predetermined scenario.

Optionally, the pose prediction model is a preset mathematical model, and the pose prediction model includes a model coefficient between the target object in the target image and the prediction result. The model coefficient can be a fixed value, a value that is dynamically modified over time, or a value that is dynamically modified with a usage scenario.

The pose prediction model may be a model based on a Markov Decision Process.

Optionally, the method further includes, prior to performing, by the computer device, the pose prediction based on the target image by using the pose prediction model that has been pre-trained to obtain the prediction result: performing reinforcement learning training by using the sample image to obtain the pose prediction model, the pose prediction model being a model based on a Markov Decision Process.

The prediction result is also referred to as predicted action information, i.e., action information of the target object that is predicted, and the action information is used to indicate a rotational distribution feature and a translational distribution feature of the target object.

In Step 203, a three-dimensional position and a three-dimensional direction of the target object are determined based on the prediction result.

The computer device estimates the six-dimensional object pose of the target object based on the prediction result, i.e., determining the three-dimensional position and three-dimensional direction of the target object.

To sum up, the embodiment of the present disclosure provides a reinforcement learning-based label-free six-dimensional object pose prediction method. According to the method, a target image to be predicted is obtained by a computer device, and the target image is a two-dimensional image including a target object; pose prediction is performed based on the target image by using a pose prediction model that has been pre-trained to obtain a prediction result, the pose prediction model being a model obtained by performing reinforcement learning based on a sample image; a three-dimensional position and a three-dimensional direction of the target object are determined based on the prediction result. That is, the pose prediction model is trained by introducing reinforcement learning, so that the problem of six-dimensional object pose estimation based on a two-dimensional image can be solved in the absence of real pose annotation, which ensures the prediction effect of label-free six-dimensional object pose prediction.

In order to implement accurate six-dimensional object pose prediction, a two-dimensional projection of a three-dimensional object is aligned with an appearance of the three-dimensional object observed in a two-dimensional image. Since the six-dimensional object pose information with real annotations is not involved, the reinforcement learning in the embodiment of the present disclosure is also called pose-free reinforcement learning, and the six-dimensional object pose prediction is performed based on the pose-free reinforcement learning. Assuming that a decision made by the policy network at each time step will be only based on a current state and will not be affected by a previous state, this can be expressed as a Markov Decision Process. The goal of the model is to maximize an expected sum of future discounted rewards. In order to implement a label-free six-dimensional object pose optimization solution by using the reinforcement learning, appropriate operations that map the label-free six-dimensional object pose optimization solution to the reinforcement learning are needed when implementing the technology. Please refer to FIG. 3, which shows a schematic diagram of principles involved in the reinforcement learning-based label-free six-dimensional object pose prediction method according to an exemplary embodiment of the present disclosure. The correspondence between six key elements in the reinforcement learning and respective elements in the solution provided in the embodiment of the present disclosure is described below.

Figure 3:
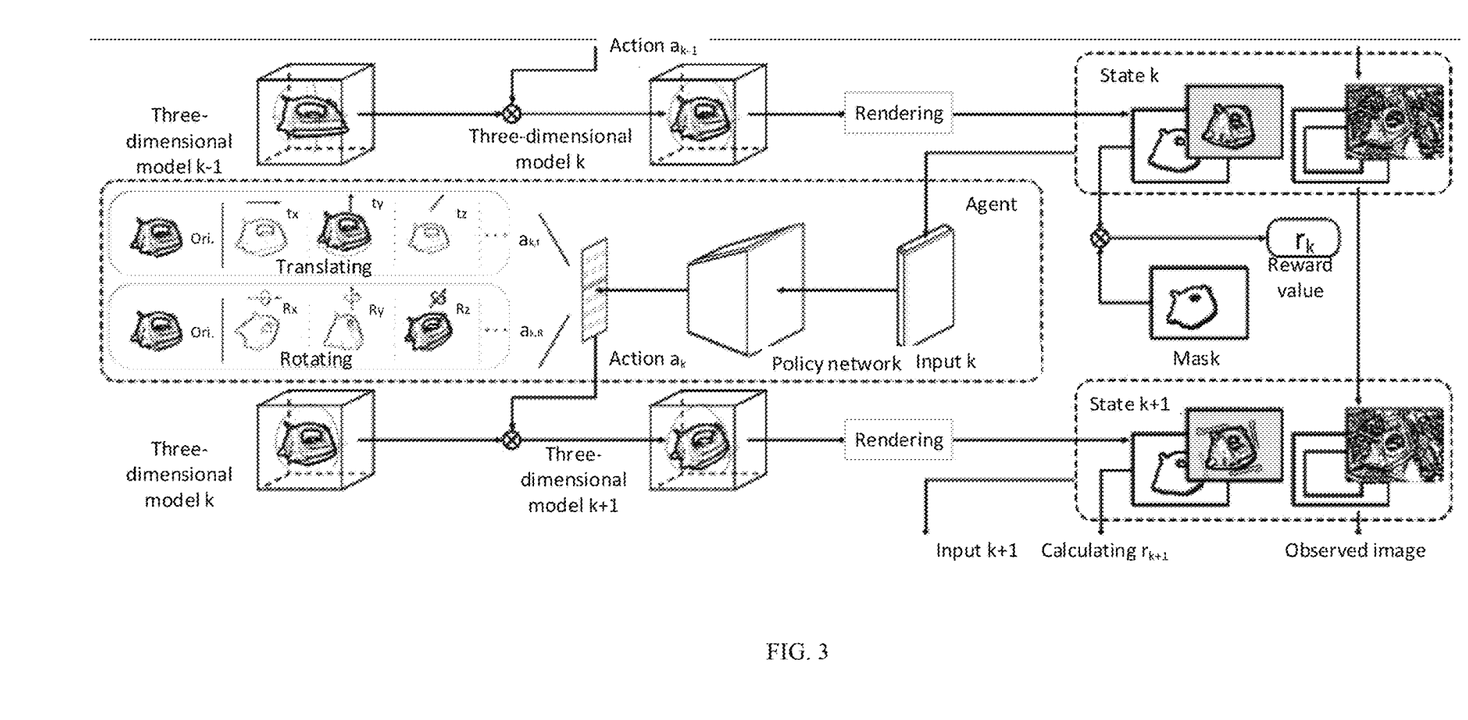
FIG. 3 shows a schematic diagram of principles involved in the reinforcement learning-based label-free six-dimensional object pose prediction method according to an exemplary embodiment of the present disclosure.

Agent, which is also referred to as Intelligence Agent, is mainly composed of a reinforcement learning model, i.e., the pose prediction model mentioned above. The pose prediction model can be implemented by a deep neural network, an input parameter of the pose prediction model is the two-dimensional image including the target object, i.e., the target image, and an output parameter of the pose prediction model is the action information of the target object. The pose prediction model is configured to provide the action information of the target object outputted based on the target image, and the training process of the model is actually a process of adjusting the action information of the target object. For example, the policy network is updated (i.e., adjusting parameters of the model) to obtain higher reward values (i.e., higher performance).

The pose prediction model includes a basic network and a policy network. The policy network includes a rotation amount branch network, a translation amount branch network and a value function branch network. The basic network is configured to extract features from the target image, the rotation amount branch network is configured to predict a rotation amount of the target object based on the features, the translation amount branch network is configured to predict a translation amount of the target object based on the features, and the rotation amount branch network and the translation amount branch network are connected together to determine a value function of the policy network based on the rotational distribution feature and the translational distribution feature of the target object.

Figure 4:
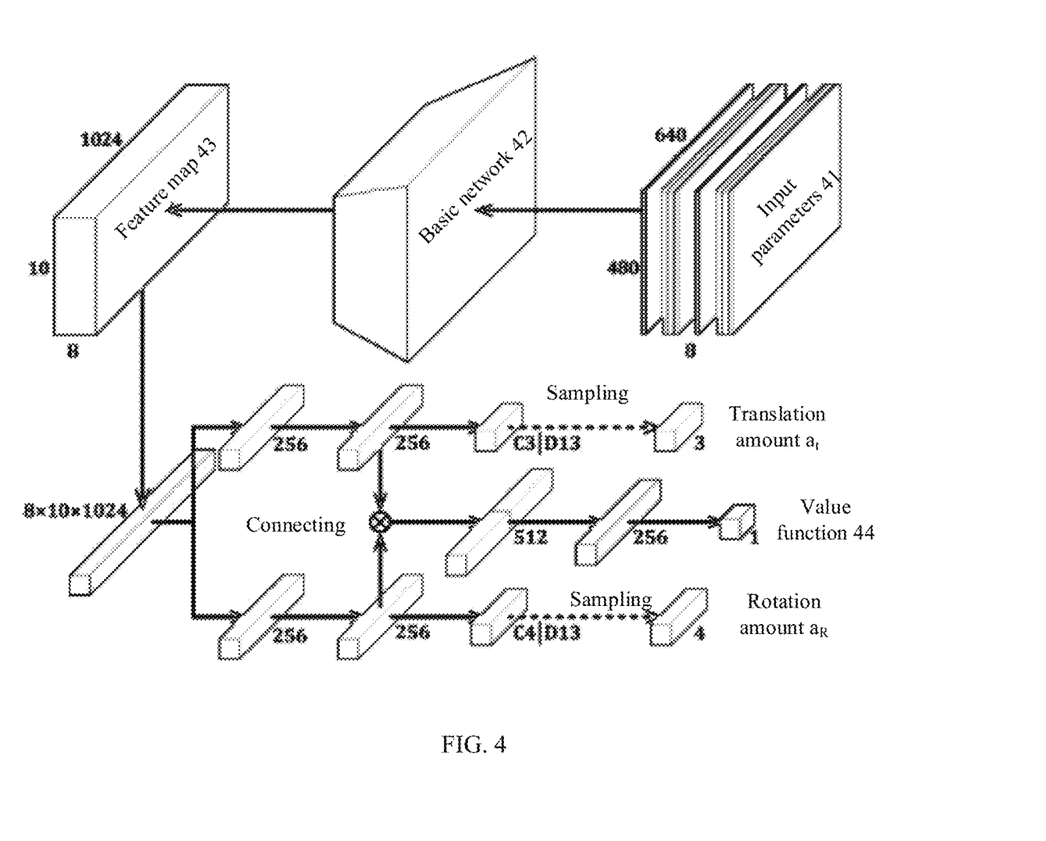
FIG. 4 shows a schematic structural diagram of a pose prediction model according to an exemplary embodiment of the present disclosure.

Schematically, as shown in FIG. 4, it shows a schematic structural diagram of a pose prediction model. A backbone includes first 11 convolutional layers of FlowNet-S. The pose prediction model includes a basic network 41 and a policy network. In the embodiments of the present disclosure, the policy network is lightweight in both training and reasoning aspects, and does not use a large number of optical flow calculations and mask branches. The policy network includes a rotation amount branch network, a translation amount branch network, and a value function branch network, that is, two independent branches are adopted to predict the separate rotation distribution and translation distribution. Each of the two branches includes 2 fully connected layers and 256 hidden units, followed by one additional fully connected layer connected thereto. The last fully connected layers of the two branches are connected together and then connected to two fully connected layers to generate the value function. In this way, the value function branch network shares the same parameters with the rotation amount branch network and the translation amount branch network, and can be used to optimize the two types of operations, rotation and translation at the same time. Before being fed into the backbone, the input image and a corresponding mask are preprocessed, the preprocessing includes cropping and upscaling, and the target object in the preprocessed input image and corresponding mask occupies a main position of the image. Taking the preprocessed input image and corresponding mask as input parameters, the basic network 42 is configured to extract a feature map 43 from the input parameters 41. The translation amount branch network is configured to predict a translation amount $a_T$ of the target object based on the feature map, the rotation amount branch network is configured to predict a rotation amount $a_R$ of the target object based on the feature map, and the value function branch network is configured to determine a value function 44 of the policy network based on the rotational distribution feature and translational distribution feature of the target object.

Environment corresponds to a target for adjustment, i.e., the target object to be adjusted.

State, also referred to as state information, includes all knowledge that the environment can provide and is used to instruct the policy network to rotate and translate the three-dimensional model. At a current time step k, an observed image of the three-dimensional model, a real mask image frame corresponding to the observed image, a rendered image, and a render mask corresponding to the rendered image are determined by a current pose. These four images are connected together to form state information sk, which is used as an input parameter of the policy network.

During testing, since the real mask image frame of the target object is not available, a render mask image frame of an initial pose can be used instead.

Reward, also referred to as reward value, is a scalar that represents a performance difference of the target object before and after applying the action information. In an exemplary embodiment, it is assumed that the state information of the target object at time k is $S_k$, the action information output by the pose prediction model based on the $S_k$ is $a_k$, and the reward value of the target object after applying the $a_k$ can be recorded as $r_k$, representing the performance change of the target object before and after applying $a_k$.

Action, also referred to as action information, is the relative SE (3) transformation performed by the policy network at each time step, which will affect a state of the environment. The representation of relative action can be used because it has the property of separating rotation and translation, that is, the effect of rotation and the effect of translation do not affect each other. Rotation and translation actions are randomly selected from two parameterized distributions of the policy network. Unlike traditional reinforcement learning methods, the value function of the policy network is estimated by connecting the rotational and translational distribution features together. Continuous distribution and discrete distribution of the policy model are evaluated separately. Taking Gaussian distribution as the form of the continuous distribution and categorical distribution as the form of the discrete distribution as an example, 13 operations were manually made for the discretely distributed rotation action and the discretely distributed translation action respectively, 12 operations of which include rotation or translation in positive and negative x, y, and z directions by a fixed stride, and the last operation of which is to maintain no translation/rotation.

Policy, also referred to as a policy network, is used to indicate a mapping relation between the state information and the action information. The policy network is a deep neural network, input parameters of which are the state information of the target object, and output parameters of which are the action information of the target object.

The reinforcement learning makes a policy decision through an interactive process between the model and the environment. Unlike supervised or unsupervised learning, the reinforcement learning relies on cumulative rewards rather than labels for training and learning. The goal of the reinforcement learning is to continuously interact with the environment, optimize its own policy based on a return of the environment, and then obtain a higher return by collecting the updated policy.

In an exemplary embodiment, the modeling is performed by a reinforcement learning method of Deep Deterministic Policy Gradient (DDPG).

It should be noted that the network structures and parameters shown in FIG. 3 and FIG. 4 are only exemplary and explanatory, and are not intended to limit the technical solutions of the present disclosure.

Figure 5:
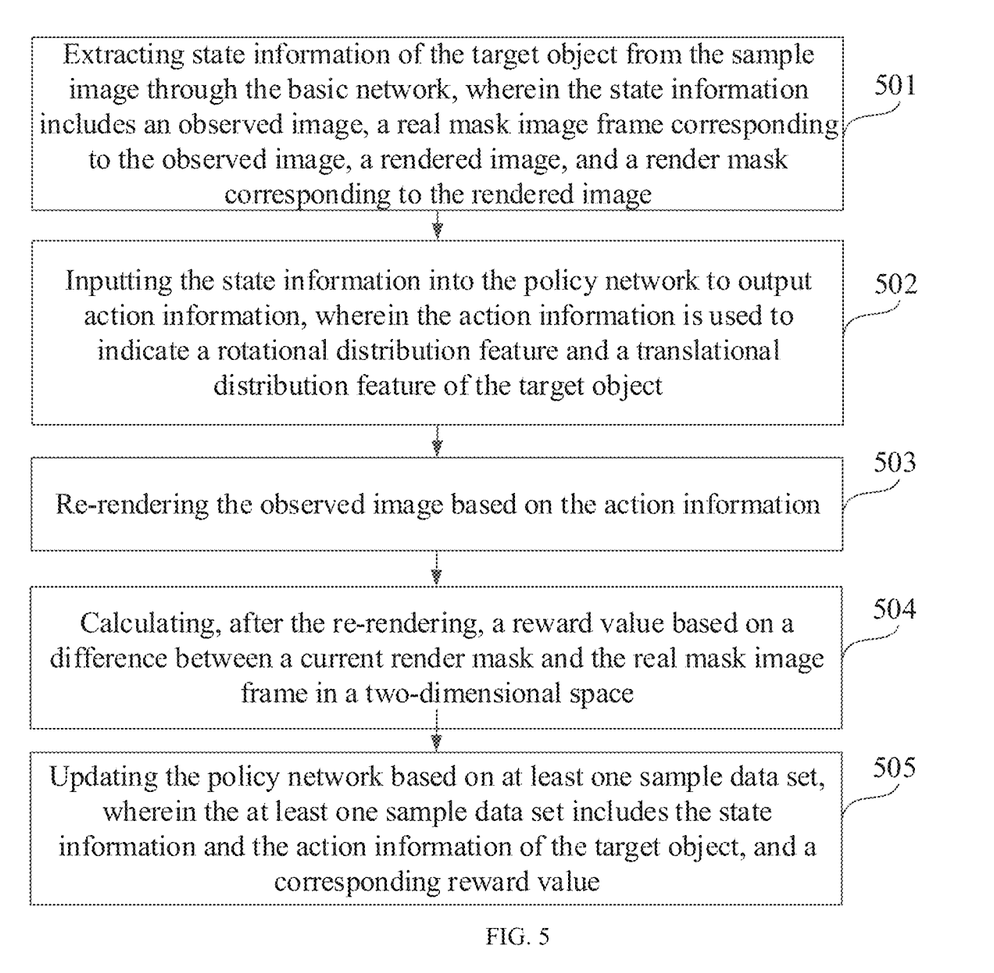
FIG. 5 shows a flowchart of a reinforcement learning-based label-free six-dimensional object pose prediction method according to another exemplary embodiment of the present disclosure.

Please refer to FIG. 5, which shows a flowchart of a reinforcement learning-based label-free six-dimensional object pose prediction method according to another exemplary embodiment of the present disclosure. The method can be applied in a computer device, and the method includes but is not limited to the following steps.

In Step 501, state information of a target object is extracted from a sample image through a basic network, the state information including an observed image, a real mask image frame corresponding to the observed image, a rendered image, and a render mask corresponding to the rendered image.

The computer device extracts the state information of the target object from the sample image through the basic network. The state information includes an observed image, a real mask image frame corresponding to the observed image, a rendered image, and a render mask corresponding to the rendered image.

Optionally, the computer device performs rendering based on a three-dimensional model of the target object and an initial six-dimensional pose estimation to obtain the rendered image of the target object and the corresponding render mask. The render mask is a mask of the target object in the rendered image.

The observed image is an image obtained by photographing the target object. The real mask image frame is a mask of the target object in the observed image, and is also referred to as a real two-dimensional mask image frame.

In Step 502, the state information is input into the policy network to output action information, the action information being used to indicate a rotational distribution feature and a translational distribution feature of the target object.

The computer device inputs the state information into the policy network to output the action information. The action information is used to indicate the rotational distribution feature and the translational distribution feature of the target object.

The policy network is configured to indicate a mapping relation between the state information and the action information, and the action information includes the rotation amount and the translation amount of the target object.

In Step 503, the observed image is re-rendered based on the action information.

The computer device re-renders the observed image based on the action information.

The computer device translates and/or rotates the three-dimensional model of the target object based on the action information to align the three-dimensional model of the target object with the observed value.

In Step 504, after the re-rendering, a reward value is calculated based on a difference between a current render mask and the real mask in a two-dimensional space.

The computer device calculates the reward value based on the difference between the current render mask and the real mask in the two-dimensional space.

After the three-dimensional model is rotated and translated, one reward function is used to update the policy network. In a pose-free case, the embodiments of the present disclosure provide a two-dimensional mask-based reward mechanism, and a reward value of the mechanism includes a differential reward value, a goal achievement reward value, and a concentration reward value. The differential reward value is used to indicate a matching degree between a current rendered image and the observed image, the concentration reward value is used to indicate a matching degree in geometric position between the current rendered image and the observed image, and the goal achievement reward value is used to indicate whether to stop updating the policy network.

The differential reward value is used to indicate the matching degree between the current rendered image and the observed image. Optionally, the differential reward value is determined based on Intersection-over-Unions (IoUs) corresponding to two adjacent time nodes. The IoU is an overlap ratio of the current render mask with the real mask, i.e., a ratio of an intersection of the current render mask and the real mask to a union of the current render mask and the real mask.

Schematically, the computer device obtains IoUs corresponding to two adjacent time nodes, respectively maps the two IoUs to a predetermined piecewise function to obtain corresponding mapping values, and determines an absolute value of a difference between the two mapping values as the differential reward value. The embodiments of the present disclosure do not limit a setting manner of the predetermined piecewise function.

The concentration reward value is used to indicate the matching degree between the current rendered image and the observed image in the geometric position. Optionally, the concentration reward value is determined based on a distance between a center of gravity corresponding to the current render mask and a center of gravity corresponding to the real mask. The current render mask is a mask of the target object in the current rendered image, and the real mask is a mask of the target object in the observed image. For example, the computer device determines the −0.5 power of the distance between the center of gravity corresponding to the current render mask and the center of gravity corresponding to the real mask as the concentration reward value.

The goal achievement reward value is used to indicate whether to stop updating the policy network. Optionally, the goal achievement reward value is a first value by default, which is used to indicate not to stop updating the policy network. If the IoU corresponding to the current time node is greater than a preset threshold, the goal achievement reward value is adjusted from the first value to a second value which is used to indicate to stop updating the policy network. For example, the first value is 0, the second value is 1, and the preset threshold is 0.95. The embodiments of the present disclosure do not limit the specific values of the first value, the second value, and the preset threshold.

It should be noted that the embodiments of the present disclosure do not limit the specific calculation methods of the differential reward value, the goal achievement reward value, and the concentration reward value.

In Step 505, the policy network is updated based on the at least one sample data set. The at least one sample data set includes the state information and the action information of the target object, and a corresponding reward value.

Since the high-dimensional state space brings high variance and instability to the training of the policy network, millions of samples are usually required to fully utilize the powerful function of the reinforcement learning model. However, it is difficult to present such a huge number of sample images in six-dimensional object pose prediction. In embodiments of the present disclosure, a task-specific compound reinforcement optimization method is provided for the six-dimensional object pose prediction, that is, an online policy and an offline policy are combined to make full use of the rendered image.

In a possible implementation manner, the computer device updating the policy network based on the at least one sample data set includes: updating the policy network based on the at least one sample data set through a PPO algorithm; and updating a value function of the policy network based on cached data in a priority queue that is set. The cached data is the at least one sample data set that is stored in a buffer and has been used.

The computer device updates the policy network based on the at least one sample data set through the PPO algorithm. The at least one sample data set includes the state information and the action information of the target object, and the corresponding reward value. For example, one sample data set is a state-action reward function $(S_k, a_k, r_k)$.

After the policy network is updated, the sample data set is no longer associated with a current policy network, that is, the action information has been sampled by a previous policy network rather than the current policy network. Therefore, the sample data set cannot be used for online policy optimization. In order to further make full use of the used sample data and make full use of the validity of the data, an offline policy value is introduced to update the policy network to assist the optimization of the policy network and to speed up the training process. By setting the priority queue in the buffer to store the used data samples, the value function of the policy network is updated based on the cached data in the priority queue that is set. The priority queue is a first-in and first-out data structure.

To sum up, the embodiments of the present disclosure provide a reinforcement learning-based label-free six-dimensional object pose prediction method, which solves the problem of six-dimensional object pose prediction based on a target image without real pose annotation, while avoiding the domain difference resulted from model training based on synthetic data. To achieve this, on the one hand, the six-dimensional object pose optimization problem is formulated as a Markov Decision Process, and the reinforcement learning is introduced. Given an initial pose estimate, the three-dimensional model of the target object is sequentially rotated and/or translated to align with the observed value. On the other hand, to train the pose prediction model, a two-dimensional mask-based reward value is designed, which is calculated based on the current rendered image and the two-dimensional mask of the target image. For each pose optimization process, the accumulated reward is maximized, resulting in a policy that can approach the target pose smoothly and quickly. Further, a compound reinforcement optimization method is proposed to efficiently learn the operation policy. Compared with existing supervised methods, the embodiments utilize a Markov decision process to optimize delayed accumulated rewards from weakly supervised mask similarity, rather than from real six-dimensional object pose annotations. Furthermore, on the LINEMOD and T-LESS datasets, better pose prediction performance is obtained compared to methods that do not use real six-dimensional pose labels.

The apparatus embodiments of the present disclosure are described below. For the parts that are not described in detail in the apparatus embodiments, reference may be made to the technical details disclosed in the above method embodiments.

Figure 6:
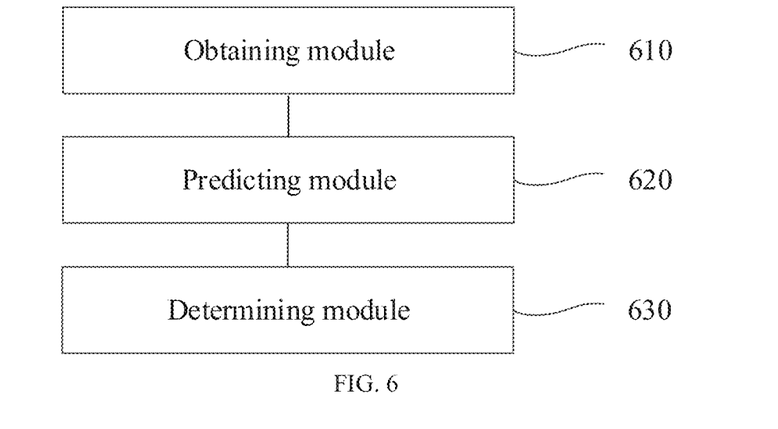
FIG. 6 shows a schematic structural diagram of a reinforcement learning-based label-free six-dimensional object pose prediction apparatus according to an exemplary embodiment of the present disclosure.

Please refer to FIG. 6, which shows a schematic structural diagram of a reinforcement learning-based label-free six-dimensional object pose prediction apparatus according to an exemplary embodiment of the present disclosure. The apparatus can be implemented as an entirety or a part of a computer device by software, hardware, or a combination thereof. The apparatus includes: an obtaining module 610, a predicting module 620, and a determining module 630.

The obtaining module 610 is configured to obtain a target image to be predicted, the target image being a two-dimensional image including a target object.

The predicting module 620 is configured to perform pose prediction based on the target image by using a pose prediction model that has been pre-trained to obtain a prediction result, the pose prediction model being a model obtained by performing reinforcement learning based on a sample image.

The determining module 630 is configured to determine a three-dimensional position and a three-dimensional direction of the target object based on the prediction result.

In a possible implementation manner, the apparatus further includes a training module.

The training module is configured to perform reinforcement learning training by using the sample image to obtain the pose prediction model, the pose prediction model being a model based on a Markov Decision Process.

In another possible implementation manner, the pose prediction model includes a basic network and a policy network, and the training module is further configured to: extract state information of the target object from the sample image through the basic network, the state information including an observed image, a real mask image frame corresponding to the observed image, a rendered image, and a render mask corresponding to the rendered image; input the state information into the policy network to output action information, the action information being used to indicate a rotational distribution feature and a translational distribution feature of the target object; re-render the observed image based on the action information; calculate, after the re-rendering, a reward value based on a difference between a current render mask and the real mask image frame in a two-dimensional space; and update the policy network based on at least one sample data set, the at least one sample data set including the state information and the action information of the target object, and a corresponding reward value.

In another possible implementation manner, the reward value includes a differential reward value, a goal achievement reward value, and a concentration reward value; and the differential reward value is used to indicate a matching degree between a current rendered image and the observed image, the concentration reward value is used to indicate a matching degree in geometric position between the current rendered image and the observed image, and the goal achievement reward value is used to indicate whether to stop said updating the policy network.

In another possible implementation manner, the training module is further configured to update the policy network based on the at least one sample data set through a PPO algorithm; and update a value function of the policy network based on cached data in a priority queue that is set, where the cached data is the at least one sample data set that is stored in a buffer and has been used.

It should be noted that when the apparatus provided in the above embodiments realizes its functions, only the division of the above functional modules is used as an example for illustration. In practical applications, the above allocated functions can be completed by different function modules according to practical requirements, that is, the content structure of the apparatus is divided into different function modules, so as to complete all or part of the functions described above.

Regarding the apparatus in the above embodiments, the specific manner in which each module performs operations has been described in detail in the embodiment of the associated method, and will not be described in detail here.

Embodiments of the present disclosure further provide a computer device, including: a processor; and a memory having instructions stored thereon, the instructions being executable by the processor, the processor being configured to implement the steps performed by the computer device in each of the above method embodiments.

Optionally, the computer device is a terminal or a server.

Embodiments of the present disclosure further provide a non-volatile computer-readable storage medium having computer program instructions stored thereon. The computer program instructions, when executed by a processor, implement the method in each of the above method embodiments.

The present disclosure may be a system, method and/or computer program product. The computer program product may include a computer-readable storage medium having computer-readable program instructions loaded thereon for causing a processor to implement various aspects of the present disclosure.

The computer-readable storage medium may be a tangible device that can hold and store instructions for use by an instruction execution device. The computer-readable storage medium may be, for example, but not limited to, an electrical storage device, a magnetic storage device, an optical storage device, an electromagnetic storage device, a semiconductor storage device, or any suitable combination of the above. More specific examples (non-exhaustive list) of the computer-readable storage medium include: a portable computer disk, a hard disk, a Random Access Memory (RAM), a Read Only Memory (ROM), an Erasable Programmable Read Only Memory (EPROM or flash memory), a Static Random Access Memory (SRAM), a Portable Compact Disk Read Only Memory (CD-ROM), a Digital Versatile Disk (DVD), a memory stick, a floppy disk, a mechanical coding device, such as a punch card or a raised structure in a groove on which instructions are stored, or any suitable combination of the above. The computer-readable storage medium, as used herein, are not to be interpreted as transient signals per se, such as radio waves or other freely propagating electromagnetic waves, electromagnetic waves propagating through waveguides or other transmission media (e.g., light pulses through fiber optic cables), or electrical signals transmitted through wires.

The computer-readable program instructions described herein may be downloaded to various computing/processing devices from a computer-readable storage medium, or downloaded to an external computer or external storage device over a network such as the Internet, a local area network, a wide area network, and/or a wireless network. The network may include copper transmission cables, fiber optic transmission, wireless transmission, routers, firewalls, switches, gateway computers, and/or edge servers. A network adapter card or network interface in each computing/processing device receives computer-readable program instructions from a network and forwards the computer-readable program instructions for storage in a computer-readable storage medium in each computing/processing device.

The computer program instructions for carrying out the operations of the present disclosure may be assembly instructions, instruction set architecture (ISA) instructions, machine instructions, machine-related instructions, microcodes, firmware instructions, state setting data, or source or object codes written in any combination of one or more programming languages, including object-oriented programming languages, such as Smalltalk, C++, etc., and conventional procedural programming languages, such as the "C" language or similar programming languages. The computer-readable program instructions may be executed entirely on the user's computer, partly on the user's computer, as a stand-alone software package, partly on the user's computer and partly on a remote computer, or entirely on a remote computer or server. In the case of a remote computer involved, the remote computer may be connected to the user's computer through any kind of network, including a Local Area Network (LAN) or a Wide Area Network (WAN), or may be connected to an external computer (e.g., over the internet provided by an internet service provider). In some embodiments, electronic circuits, such as programmable logic circuits, Field Programmable Gate Arrays (FPGAs), or Programmable Logic Arrays (PLAs), can be customized by using state information of computer-readable program instructions and can execute the computer readable program instructions, thereby implementing various aspects of the present disclosure.

Various aspects of the present disclosure are described herein with reference to flowcharts and/or block diagrams of methods, apparatuses (systems) and computer program products according to embodiments of the disclosure. It will be understood that each block of the flowcharts and/or block diagrams, and combinations of blocks in the flowcharts and/or block diagrams, can be implemented by the computer-readable program instructions.

These computer-readable program instructions may be provided to a processor of a general-purpose computer, special purpose computer or other programmable data processing apparatuses to produce a machine, so that when the instructions are executed by the processor of the computer or other programmable data processing apparatuses, an apparatus for implementing the functions/actions specified in one or more blocks of the flowcharts and/or block diagrams is produced. These computer-readable program instructions can also be stored in a computer-readable storage medium, and these instructions cause a computer, programmable data processing apparatus and/or other device to operate in a specific manner, so that the computer-readable medium storing the instructions includes an article of manufacture including instructions for implementing various aspects of the functions/actions specified in one or more blocks of the flowcharts and/or block diagrams.

The computer-readable program instructions can also be loaded onto a computer, other programmable data processing apparatus, or other device to cause a series of operational steps to be performed on the computer, other programmable data processing apparatus, or other device to produce a computer-implemented process, thereby causing instructions executing on a computer, other programmable data processing apparatus, or other device to implement the functions/actions specified in one or more blocks of the flowcharts and/or block diagrams.

The flowcharts and block diagrams in the figures illustrate the architectures, functions, and operations of possible implementations of systems, methods and computer program products according to various embodiments of the present disclosure. In this regard, each block in the flowchart or block diagrams may represent a module, program segment, or a portion of instructions, which includes one or more executable instructions for implementing the specified logical functions. In some alternative implementations, the functions denoted in the blocks may occur in an order different from the order denoted in the figures. For example, two blocks in succession may, in fact, be executed substantially concurrently, or sometimes be executed in a reverse order, depending on the functions involved. It is also noted that each block of the block diagrams and/or flowcharts, and combinations of blocks in the block diagrams and/or flowcharts, can be implemented in dedicated hardware-based systems that perform the specified functions or actions, or can be implemented in a combination of dedicated hardware and computer instructions.

Various embodiments of the present disclosure have been described above, and the above descriptions are exemplary rather than exhaustive, and embodiments of the present disclosure are not limited to the disclosed embodiments. Numerous modifications and variations will be apparent to those of ordinary skill in the art without departing from the scope and essence of the described embodiments. The terminology used herein was chosen to best explain the principles of the embodiments, the practical application or technical improvement over the technology in the market, or to enable those of ordinary skill in the art to understand the embodiments disclosed herein.

What is claimed is:

1. A reinforcement learning-based label-free six-dimensional object pose prediction method, the method being applied in a computer device and comprising:
    obtaining a target image to be predicted, the target image being a two-dimensional image comprising a target object;
    performing pose prediction based on the target image by using a pose prediction model that has been pre-trained to obtain a prediction result, wherein the pose prediction model is a model obtained by performing reinforcement learning based on a sample image; and
    determining a three-dimensional position and a three-dimensional direction of the target object based on the prediction result,
    wherein the method further comprises, prior to said performing the pose prediction based on the target image by using the pose prediction model that has been pre-trained to obtain the prediction result:
    performing reinforcement learning training by using the sample image to obtain the pose prediction model, wherein the pose prediction model is a model based on a Markov Decision Process,
    wherein the pose prediction model comprises a basic network and a policy network, and said performing the reinforcement learning training by using the sample image to obtain the pose prediction model comprises:
    extracting state information of the target object from the sample image through the basic network, wherein the state information comprises an observed image, a real mask image frame corresponding to the observed image, a rendered image, and a render mask corresponding to the rendered image;
    inputting the state information into the policy network to output action information, wherein the action information is used to indicate a rotational distribution feature and a translational distribution feature of the target object;
    re-rendering the observed image based on the action information;
    calculating, after the re-rendering, a reward value based on a difference between a current render mask and the real mask image frame in a two-dimensional space; and
    updating the policy network based on at least one sample data set, wherein the at least one sample data set comprises the state information and the action information of the target object, and a corresponding reward value.

2. The method according to claim 1, wherein the reward value comprises a differential reward value, a goal achievement reward value and a concentration reward value,
    wherein the differential reward value is used to indicate a matching degree between a current rendered image and the observed image, the concentration reward value is used to indicate a matching degree in geometric position between the current rendered image and the observed image, and the goal achievement reward value is used to indicate whether to stop updating the policy network.

3. The method according to claim 1, wherein said updating the policy network based on at least one sample data set comprises:
    updating the policy network based on the at least one sample data set through a Proximal Policy Optimization algorithm; and
    updating a value function of the policy network based on cached data in a priority queue that is set, wherein the cached data is the at least one sample data set that is stored in a buffer and has been used.

4. A reinforcement learning-based label-free six-dimensional object pose prediction apparatus, the apparatus being applied in a computer device and comprising:
    an obtaining module configured to obtain a target image to be predicted, the target image being a two-dimensional image comprising a target object;
    a predicting module configured to perform pose prediction based on the target image by using a pose prediction model that has been pre-trained to obtain a prediction result, wherein the pose prediction model is a model obtained by performing reinforcement learning based on a sample image; and
    a determining module configured to determine a three-dimensional position and a three-dimensional direction of the target object based on the prediction result,
    the apparatus further includes: a training module configured to perform reinforcement learning training by using the sample image to obtain the pose prediction model, the pose prediction model being a model based on a Markov Decision Process,
    the pose prediction model includes a basic network and a policy network, and the training module is further configured to: extract state information of the target object from the sample image through the basic network, the state information including an observed image, a real mask image frame corresponding to the observed image, a rendered image, and a render mask corresponding to the rendered image; input the state information into the policy network to output action information, wherein the action information is used to indicate a rotational distribution feature and a translational distribution feature of the target object; re-render the observed image based on the action information; calculate, after the re-rendering, a reward value based on a difference between a current render mask and the real mask image frame in a two-dimensional space; and update the policy network based on at least one sample data set, where the at least one sample data set includes the state information and the action information of the target object, and a corresponding reward value.

5. A computer device, comprising:
a processor; and
a memory having instructions stored thereon, the instructions being executable by the processor,
wherein the processor is configured to:
obtain a target image to be predicted, the target image being a two-dimensional image comprising a target object;
perform pose prediction based on the target image by using a pose prediction model that has been pre-trained to obtain a prediction result, wherein the pose prediction model is a model obtained by performing reinforcement learning based on a sample image; and
determine a three-dimensional position and a three-dimensional direction of the target object based on the prediction result,
wherein the processor is further configured to, prior to said performing the pose prediction based on the target image by using the pose prediction model that has been pre-trained to obtain the prediction result:
perform reinforcement learning training by using the sample image to obtain the pose prediction model, wherein the pose prediction model is a model based on a Markov Decision Process,
wherein the pose prediction model comprises a basic network and a policy network, and said performing the reinforcement learning training by using the sample image to obtain the pose prediction model comprises:
extracting state information of the target object from the sample image through the basic network, wherein the state information comprises an observed image, a real mask image frame corresponding to the observed image, a rendered image, and a render mask corresponding to the rendered image;
inputting the state information into the policy network to output action information, wherein the action information is used to indicate a rotational distribution feature and a translational distribution feature of the target object;
re-rendering the observed image based on the action information;
calculating, after the re-rendering, a reward value based on a difference between a current render mask and the real mask image frame in a two-dimensional space; and
updating the policy network based on at least one sample data set, wherein the at least one sample data set comprises the state information and the action information of the target object, and a corresponding reward value.

6. The computer device according to claim 5, wherein the reward value comprises a differential reward value, a goal achievement reward value and a concentration reward value,
wherein the differential reward value is used to indicate a matching degree between a current rendered image and the observed image, the concentration reward value is used to indicate a matching degree in geometric position between the current rendered image and the observed image, and the goal achievement reward value is used to indicate whether to stop updating the policy network.

7. The computer device according to claim 5, wherein said updating the policy network based on at least one sample data set comprises:
updating the policy network based on the at least one sample data set through a Proximal Policy Optimization algorithm; and
updating a value function of the policy network based on cached data in a priority queue that is set, wherein the cached data is the at least one sample data set that is stored in a buffer and has been used.

8. A non-volatile computer-readable storage medium, having computer program instructions stored thereon, wherein the computer program instructions, when executed by a processor, implement the method according to claim 1.

9. The non-volatile computer-readable storage medium according to claim 8, wherein the reward value comprises a differential reward value, a goal achievement reward value and a concentration reward value,
wherein the differential reward value is used to indicate a matching degree between a current rendered image and the observed image, the concentration reward value is used to indicate a matching degree in geometric position between the current rendered image and the observed image, and the goal achievement reward value is used to indicate whether to stop updating the policy network.

10. The non-volatile computer-readable storage medium according to claim 8, wherein said updating the policy network based on at least one sample data set comprises:
updating the policy network based on the at least one sample data set through a Proximal Policy Optimization algorithm; and
updating a value function of the policy network based on cached data in a priority queue that is set, wherein the cached data is the at least one sample data set that is stored in a buffer and has been used.

* * * * *